United States Patent

Peterson

[15] 3,655,335

[45] *Apr. 11, 1972

[54] PRODUCTION OF PHOSPHATES

[72] Inventor: John A. Peterson, Niagara Falls, N.Y.

[73] Assignee: Hooker Chemical Corporation, Niagara Falls, N.Y.

[ * ] Notice: The portion of the term of this patent subsequent to Jan. 14, 1986, has been disclaimed.

[22] Filed: Dec. 31, 1968

[21] Appl. No.: 789,011

[52] U.S. Cl..........................................................23/107
[51] Int. Cl....................................C01b 25/28, C01b 25/30
[58] Field of Search.....................23/107, 106, 165 B; 71/43

[56] References Cited

UNITED STATES PATENTS 3,421,849  1/1969  Peterson..................................23/107

*Primary Examiner*—Oscar R. Vertiz
*Assistant Examiner*—Gregory A. Heller
*Attorney*—Peter F. Casella, Donald C. Studley, Richard P. Mueller, James F. Mudd and William C. Henson

[57] ABSTRACT

A process for making pure alkali metal or ammonium phosphates wherein wet process phosphoric acid is treated with iron powder, the acid-iron mixture neutralized with a basic material to a pH of 3.5–9. The resulting slurry is filtered and a pure phosphate product recovered from the filtrate.

14 Claims, No Drawings

PRODUCTION OF PHOSPHATES

This invention relates to the production of alkali metal and ammonium phosphates. More particularly, this invention relates to a process for the production of pure alkali metal and ammonium phosphates from crude, impure wet process phosphoric acid.

Heretofore, alkali metal and ammonium phosphates have generally been produced by the base neutralization of either phosphoric acid obtained by the so-called dry process involving the oxidation of elemental phosphorus or by the so-called wet process wherein phosphate rock is decomposed by the addition thereto of sulfuric acid. In those processes presently available wherein phosphoric acid produced by the dry process has been employed as the starting material for the production of alkali metal or ammonium phosphates, highly pure phosphatic products have resulted, provided, of course, that the base employed in the neutralization step has also been of high purity. While the alkali metal or ammonium phosphates produced by such a process is recoverable in a highly pure state, such stringent purity requirements for the starting materials render such processes less than economically desirable. Although phosphoric acid produced by the wet process method provides an economically attractive reactant, the reaction product obtained by the wet process method is low in acid concentration and more importantly, low in purity. Upon neutralization of such wet process phosphoric acid with an appropriate base, in accordance with present procedures, a complex phosphate precipitate is formed containing a major portion of the inorganic impurities present in the wet process phosphoric acid starting material. Complete removal of this complex precipitate has heretofore proven to be extremely difficult due to the fact that the complex precipitate formed in currently used neutralization processes is in a difficultly filterable form. Failure to remove the precipitated impurities has therefore resulted in the continued production of impure alkali metal and ammonium phosphates.

It has now been found that highly pure alkali metal and ammonium phosphates can be produced from impure wet process phosphoric acid by treating wet process phosphoric acid with metallic iron in an amount of from about 0.1 to about 2.0 percent by weight of the acid for a period of from about 5 minutes to about 60 minutes at 40° to 120° C., with the iron addition sufficient to provide the acid with an oxidation-reduction potential of from about −30 to about +200 millivolts; neutralizing the thus-treated acid with a basic material selected from the group consisting of alkali metal hydroxides and carbonates, ammonium hydroxide and carbonates, and ammonia at a temperature of from about 90° to about 110° C. to form a slurry having a pH of from about 3.5 to about 9; filtering the neutralized phosphoric acid reaction mixture to remove completely the complex phosphate precipitate and recovering the pure alkali metal or ammonium phosphate from the filtrate.

Recovery of alkali metal and ammonium phosphates of excellent purity is effected by the process of the present invention. Generally, maximum results are effected by adding from about 1.0 to about 1.4 percent by weight of finely divided iron powder to the wet process phosphoric acid (expressed as 50–54 percent $P_2O_5$ conc.) during the acid treating step when neutralization is to be effected at about a pH of 6.5. Such addition results in a treated acid solution having an oxidation-reduction potential on the order of from about −30 to about +30 millivolts compared to +150 to +300 millivolts for the untreated phosphoric acid when measured by Beckman Model G pH meter. In a similar manner, optimum results at a neutralization pH of about 9.0 are obtained by the addition of from about 0.3 to about 0.7 percent by weight of iron powder, which provides a treated acid solution having an oxidation-reduction potential on the order of from about +40 to about +100 millivolts.

Suitable wet process phosphoric acid finding application in the present process is generally that having the conventional evaporated strength of from about 50 to about 54 percent $P_2O_5$. However, acid having about a 30 percent $P_2O_5$ content may also be advantageously employed provided that the fluorine content is as low as or is lowered to less than about 0.5 percent. Removal of the fluorine may be conveniently accomplished by, for example, adding an amount of a sodium or potassium salt sufficient to furnish one mole of sodium or potassium per each 3 moles of fluorine present, such addition serving to reduce the fluorine content by precipitating the fluorine as alkali metal fluorosilicate, which can be easily removed by filtration.

The metallic iron suitable for use in the present process is generally finely divided iron powder having a size not exceeding about 60 mesh. Preferably, finely divided iron powder having a size of about under 100 mesh is employed.

When metallic iron is added to wet process phosphoric acid, two types of reaction take place:

1. metallic iron reduces hydrogen ions to elemental hydrogen and is itself oxidized to ferrous iron;
2. metallic iron brings about reduction of some of the metal species present in the acid to their lower valence states, the major species present being ferric ion which is reduced to ferrous ion.

Reduction of the metal species as in (2) is necessary to promote maximum precipitation of compounds of these metals upon neutralization and to bring about maximum filter rates for the neutral slurry.

It has been found that the size of the iron particles determines which of the reactions, (1) or (2), predominates. Metallic iron added in a coarse or massive form, such as nails, scrap pieces, tornings or coarse filings result in 80-90-percent reaction as in (1). Finely divided iron powder, of a size not generally greater than 60 mesh, however, acts to reduce the metal species, primarily ferric ion, as in (2).

Addition of the metallic iron to the wet process phosphoric acid reactant may be accomplished by any suitable method designed to provide maximum contact between the phosphoric acid and the metallic iron. Addition may be effected either in an incremental or continuous fashion.

The temperature of the wet process phosphoric acid during the addition thereto of the metallic iron, is not critical to the reaction but higher temperatures will decrease time required. Generally, temperatures of from about 40° to about 110° C. have been employed with good results, with a temperature of about 70 degrees centigrade most preferred.

The neutralization step is effected by adding the selected basic reactant to the treated phosphoric acid in an amount sufficient to obtain the desired pH and to produce the desired neutralization product. Addition of the basic reactant may be effected by any desirable manner when the pH of the neutral slurry is greater than about 7.5. However, it has been found when the neutralizing agent is caustic or ammonium hydroxide and the pH of the neutralized slurry is less than about 7.5 that the rapid formation of a highly filterable phosphate complex requires the distribution of the acid feed onto a foam layer or bed produced on the surface of neutralized slurry while a proportional amount of caustic or ammonium hydroxide is injected into the body of the slurry.

The foam layer or bed may be conveniently produced by sparging the neutral slurry with a gas such as air or nitrogen, or by replacing a portion of the basic feed with a carbonate whose cation is that of the basic reactant, or by converting a portion of the basic feed to carbonate by contacting the base with air or carbon dioxide. Carbon dioxide released in the neutralization will create the foam layer or bed on the surface of the reaction medium. The employment of such an addition technique is especially warrented as previously stated if the pH is to be less than about 7.5, and the basic reactant is either caustic, or ammonium hydroxide.

The basic reactant employed in the process of the present invention is, as stated, selected from the group consisting of alkali metal hydroxides and carbonates, ammonium hydroxide and ammonia.

Preferably, sodium hydroxide is the basic reactant employed, although the process herein disclosed is equally applicable to the other basic reactants hereinbefore enumerated. The sodium hydroxide reactant, when sodium phosphates are to be produced, may be in any form and the purity thereof is not generally a limiting factor. For example, the liquor from the catholyte compartment of a chlor-alkali electroytic cell may be advantageously employed in the present process. Concentrated aqueous solutions of sodium hydroxide may also be used as well as anhydrous sodium hydroxide.

Formation of an easily filterable phosphate complex precipitate is further enhanced by so observing the concentration of solutes in the liquid phase of the neutralized slurry as to provide a concentration of from about 25 to about 35 percent by weight. Concentrations of solutes within this range generally can be effected by the addition of a suitable amount of water diluent, either by direct addition to the reaction vessel or as an adjunct to the acid or basic reaction streams.

Filtration of the reaction mixture to remove the phosphate complex precipitate may be effected immediately following neutralization to the desired pH without the necessity of aging the reaction mixture for any appreciable period. However, it is preferred to allow the reaction mixture to age at from about 50° to about 100° C. for a period of from about 15 minutes to about 4 hours following the addition of the reactants.

Recovery of the phosphate product from the filtrate is conveniently accomplished by crystallization followed by filtration to remove the crystals from the mother liquor. This is essential where the base used is cell liquor which introduces large amounts of salt, NaCl, into the phosphate solution. In those instances where the impure acid reactant contains organic as well as inorganic impurities, such may be removed by the addition of a small amount, e.g., 0.05 to 0.3 percent, hydrogen peroxide, used as a dilute solution, prior to the crystallization step. This is particularly needed if the filtrate is to be very concentrated by evaporation prior to crystallization as in the recovery of disodium phosphate as $Na_2HPO_4 \cdot 2 H_2O$.

The practice of the present invention will become further apparent from the following examples which are set forth by way of illustration and not by way of limitation.

EXAMPLE I

Wet process phosphoric acid (1,521 grams) containing 53.5 percent $P_2O_5$ was mixed with 76 grams of iron powder (100–325 mesh) and held with stirring for 15 minutes at 75° C. The oxidation-reduction potential of the input acid was +230 millivolts and of the treated acid +78 millivolts (at 25° C.).

The treated acid, 1,335 grams of water, and 1,940 grams of a sodium hydroxide solution containing 50 percent sodium hydroxide and one percent sodium chloride were combined over a period of 60 minutes, by the addition of the separate reactant streams to a common bed of a stirred slurry with acid neutralization and complex phosphate precipitation taking place at constant temperature (90°–100° C) and pH (7.7). The resulting slurry weighted 4,500 grams.

Following a 15-minute post-addition period during which the slurry was stirred at a temperature of 75°–90° C., the slurry was filtered by vacuum at 25 millimeters mercury. The rate of filtration was on the order of 2,500 grams slurry/100 cm²/minutes. The crude filter cake (700 grams) weighed 342 grams after drying at 120° C.

The filtrate was added to a crystallizer from where pure disodium phosphate dihydrate crystals were obtained.

EXAMPLE II

Wet process phosphoric acid (400 grams) containing 53.5 percent $P_2O_5$ was mixed with 4.0 grams iron powder (100–325 mesh) while stirring at a temperature of 75° C. over a period of 15 minutes. The oxidation-reduction potential of the treated acid was +28 millivolts.

One hundred eighty two grams of the treated acid was neutralized with 100 grams of sodium hydroxide contained in 338 grams of solution by adding 45.5 grams of the acid slowly at 90°–100° C. to 84.5 grams of the sodium hydroxide solution to form a heel of neutral slurry, and the balance of the reactants were then added to the heel simultaneously over a 20-minute period. During the period of addition, the slurry was maintained at 90°–100° C. and pH 6.5. A stream of nitrogen was passed through the slurry during the addition period to create and maintain a foam layer one to two inches thick. The addition was effected by pumping the sodium hydroxide solution into the stirred slurry below the foam layer while the acid was added dropwise onto the top surface of the foam layer.

The resulting slurry was filtered after being stirred for a post-addition period of 15 minutes at a temperature of 75 degrees centigrade. The filter rate was 320 grams slurry/100 cm²/minute.

A similar run conducted without a foam bed resulted in a filter rate of less than 24 grams slurry/100 cm²/minute.

EXAMPLE III

The procedure of Example II was followed with the exception that 10 mole percent of the sodium hydroxide reactant was replaced by sodium carbonate as a foam-producing agent. Similar results were effected as in Example II.

EXAMPLES IV AND V

Wet process phosphoric acid was treated with finely divided iron powder to provide a treated solution having an oxidation-reduction potential of +20 millivolts. The treated acid was distributed onto the surface of a foam bed on the neutralizer slurry heel wile ammonia was injected into the heel. The temperature of the slurry was maintained at 90°–100° C. and pH 3.5 during the period of addition. The foam bed was effected and maintained by air sparging during the addition of the reactant streams. The dissolved solids content was maintained at less than about 36 percent by weight. The neutral slurry was filtered at a rapid rate to yield a clear stable ammonium phosphate solution. Pure ammonium phosphate was recovered by crystallization.

Excellent quality ammonium phosphate was also obtained by substituting the ammonia reactant with a solution of ammonium hydroxide containing 10 percent ammonium carbonate as the sparging agent, and following the procedure of Example IV.

What is claimed is:

1. A process for the production of pure alkali metal and ammonium phosphates from crude impure wet process phosphoric acid which comprises:

a. treating wet process phosphoric acid with iron powder having a size not greater than about 60 mesh in an amount of from about 0.1 to about 2.0 percent by weight based on the weight of the phosphoric acid for a period of from about 5 to about 60 minutes at a temperature of from about 40° to about 120° C.;

b. neutralizing the treated phosphoric acid with a basic material selected from the group consisting of alkali metal hydroxides and carbonates, ammonium hydroxide and carbonate, and ammonia at a temperature of from about 90° to about 110° C. to form a slurry having a pH of from about 3.5 to about 9;

c. filtering the neutralized phosphoric acid slurry and d. recovering the pure phosphatic product from the filtrate.

2. A process as claimed in claim 1 wherein the base employed is impure sodium hydroxide obtained from the catholytic compartment of a chlor-alkali electrolytic cell.

3. A process as claimed in claim 1 wherein recovery of the phosphatic product is effected by crystallization of the phosphatic product from the filtrate.

4. A process as claimed in claim 1 wherein the elemental iron is added in an amount of from about 1.0 to about 1.4 percent by weight and the neutralization is effected to a pH of about 6.5.

5. A process as claimed in claim 1 wherein the elemental iron is added in an amount of from about 0.3 to about 0.7 percent by weight and the neutralization is effected to a pH of about 8.0.

6. A process as claimed in claim 1 wherein the basic reactant is ammonia.

7. A process as claimed in claim 1 wherein the basic reactant is hydroxyl-containing, the pH is less than about 7.5 and the neutralization is conducted in ebullient reaction medium.

8. A process for the production of pure alkali metal and ammonium phosphates from crude impure wet process phosphoric acid which comprises:
   a. treating wet process phosphoric acid with iron powder having a size not greater than about 60 mesh in an amount of from about 0.1 to about 2.0 percent by weight, based on the weight of the phosphoric acid, for a period of from about 5 to about 60 minutes at a temperature of from about 40° to about 120° C.;
   b. neutralizing the treated phosphoric acid with a basic material selected from the group consisting of alkali metal hydroxides and carbonates, ammonium hydroxide and carbonate and ammonia at a temperature of from about 90° to about 110° C. to form a slurry having a pH of from about 7.5 to about 9;
   c. filtering the neutralized phosphoric acid slurry, and
   d. recovering the pure phosphatic product from the filtrate.

9. A process for the production of pure alkali metal and ammonium phosphates from crude wet process phosphoric acid which comprises:
   a. treating wet process phosphoric acid with iron powder having a size not greater than about 60 mesh in an amount of from about 0.1 to about 2.0 percent by weight, based on the weight of the phosphoric acid, for a period of from about 5 to about 60 minutes at a temperature of from about 40° to about 120° C.;
   b. neutralizing the treated phosphoric acid, in ebullient reaction medium, with a basic material selected from the groups consisting of alkali metal hydroxides and carbonates, ammonium hydroxide and carbonate and ammonia at a temperature of from about 90° to about 110° C. to form a slurry having a pH of from about 3.5 to about 9;
   c. filtering the neutralized phosphoric acid slurry, and
   d. recovering the pure phosphatic product from the filtrate.

10. A process for the production of pure alkali metal and ammonium phosphates from crude wet process phosphoric acid which comprises:
   a. treating wet process phosphoric acid with iron powder having a size not greater than about 60 mesh in an amount of from about 0.1 to about 2.0 percent by weight, based on the weight of the phosphoric acid, fro a period of from about 5 to about 60 minutes at a temperature of from about 40° to about 120° C.;
   b. neutralizing the treated phosphoric acid with a basic material selected from the group consisting of ammonia and alkali metal and ammonium carbonate at a temperature of from about 90° to about 110° to form a slurry having a pH of from about 3.5 to about 9;
   c. filtering the neutralized phosphoric acid slurry, and
   d. recovering the pure phosphatic product from the filtrate.

11. A process for the production of pure sodium phosphate from crude impure wet process phosphoric acid which comprises
   a. treating wet process phosphoric acid with elemental iron powder having a mesh size of from about 60 mesh to about 325 mesh in an amount of from about 0.15 to about 1.4 percent by weight based on the weight of phosphoric acid,
   b. neutralizing the treated phosphoric acid at a temperature of from about 90° to about 105°–110° C. with sodium hydroxide in an amount sufficient to provide a slurry having a pH of greater than about 7.5,
   c. maintaining the neutralized phosphoric acid at a temperature of from about 40° to about 100° C. for a period of from about 15 to about 240 minutes,
   d. filtering the neutralized phosphoric acid slurry and
   e. recovering the pure sodium phosphate product from the filtrate.

12. A process as claimed in claim 11 wherein the sodium hydroxide is cell liquor from the catholytic compartment of a chlor-alkali electrolytic cell and the recovery of the sodium phosphate product from the filtrate is effected by crystallization.

13. A process as claimed in claim 7 wherein the elemental iron is added in an amount of from about 1.0 to about 1.4 percent by weight and neutralization is effected to a pH of about 8.0.

14. A process as claimed in claim 11 wherein the elemental iron is added in an amount of from about 0.3 to about 0.7 percent by weight and the neutralization is effected to a pH of about 8.0, and the acid reactant is added to the reaction medium by distribution onto a foam layer produced on the surface of the neutralized slurry, the foam layer produced by sparging the slurry with a gas.

* * * * *